(12) United States Patent
Nystad

(10) Patent No.: US 8,713,292 B2
(45) Date of Patent: Apr. 29, 2014

(54) REDUCING ENERGY AND INCREASING SPEED BY AN INSTRUCTION SUBSTITUTING SUBSEQUENT INSTRUCTIONS WITH SPECIFIC FUNCTION INSTRUCTION

(75) Inventor: Jorn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 561 days.

(21) Appl. No.: 12/929,666

(22) Filed: Feb. 7, 2011

(65) Prior Publication Data

US 2012/0204006 A1     Aug. 9, 2012

(51) Int. Cl.
*G06F 9/00*     (2006.01)
(52) U.S. Cl.
USPC .......................................................... 712/226
(58) Field of Classification Search
USPC .......................................................... 712/226
See application file for complete search history.

(56) References Cited

U.S. PATENT DOCUMENTS

| | | | | |
|---|---|---|---|---|
| 2005/0289519 A1* | 12/2005 | Sazegari et al. | ................ | 717/136 |
| 2007/0083737 A1* | 4/2007 | Bradley | ........................ | 712/226 |
| 2009/0077356 A1* | 3/2009 | Fulton | ............................ | 712/226 |
| 2009/0198978 A1* | 8/2009 | Greenhalgh et al. | .......... | 712/226 |
| 2009/0290773 A1* | 11/2009 | Holt et al. | ..................... | 382/131 |

* cited by examiner

*Primary Examiner* — Andrew Caldwell
*Assistant Examiner* — Jyoti Mehta
(74) *Attorney, Agent, or Firm* — Nixon & Vanderhye P.C.

(57) ABSTRACT

A data processing system is used to evaluate a data processing function by executing a sequence of program instructions including an intermediate value generating instruction and an intermediate value consuming instruction. In dependence upon one or more input operands to the evaluation, an embedded opcode within the intermediate value passed between the intermediate value generating instruction and the intermediate value consuming instruction may be set to have a value indicating that a substitute instruction should be used in place of the intermediate value consuming instruction. The instructions may be floating point instructions, such as a floating point power instruction evaluating the data processing function $a^b$.

17 Claims, 4 Drawing Sheets

REDUCING ENERGY AND INCREASING SPEED BY AN INSTRUCTION SUBSTITUTING SUBSEQUENT INSTRUCTIONS WITH SPECIFIC FUNCTION INSTRUCTION

BACKGROUND OF THE INVENTION

1. Field of the Invention

This invention relates to the field of data processing systems. More particularly, this invention relates to data processing systems which evaluate a data processing function using a sequence of program instructions with those instructions including an intermediate value generating instruction and an intermediate value consuming instruction between which an intermediate value is passed.

2. Description of the Prior Art

When evaluating a data processing function it is known, for a variety of reasons, to provide a sequence of program instructions which are executed to evaluate the data processing function concerned. As an example, a complex data processing function may be computationally intensive to evaluate and accordingly cannot be evaluated within a single processing cycle at the desired clock frequency. In this circumstance it is possible to divide the evaluation of the data processing function over several processing cycles by using a sequence of program instructions which between them evaluate the data processing function. As the sequence of data processing instructions cooperate in evaluating the processing function, it is normally necessary for them to pass intermediate processing results between the instructions within the sequence in order that each instruction may perform its part of the evaluation which may depend upon the partial results already determined by preceding instructions within the sequence of program instructions. The intermediate values passed between the instructions within the sequence of program instructions may or may not be externally visible to the programmer.

SUMMARY OF THE INVENTION

Viewed from one aspect the present invention provides an apparatus for processing data comprising:

data processing circuitry configured to execute data processing operations specified by program instructions; and instruction decoder circuitry configured to decode program instructions to generate control signals for controlling said data processing circuitry to execute said data processing operations specified by said program instructions; wherein said instruction decoder circuitry and said data processing circuitry are configured to decode and to execute a sequence of program instructions to evaluate a data processing function;

said sequence of program instructions includes an intermediate value generating instruction for controlling generation of an intermediate value including an intermediate data value and an embedded opcode value;

said sequence of program instructions includes, after said intermediate value generating instruction, an intermediate value consuming instruction for consuming said intermediate value;

said instruction decoder circuitry and said data processing circuitry are configured to operate in dependence upon said embedded opcode value to follow one of a first execution path and a second execution path:

(i) said first execution path comprising completing evaluation of said data processing function using said intermediate value consuming instruction; and (ii) said second execution path comprising substituting a substitute instruction in place of said intermediate value consuming instruction and executing said substitute instruction to evaluate said data processing function instead of said sequence of program instructions.

The present technique recognises that a sequence of program instructions formed to evaluate a data processing function may be generic and capable of evaluating that data processing function in all circumstances, but this may not be the most efficient approach for a given desired evaluation. As an example, partway through the evaluation of a data processing function it may be detected that the evaluation concerned is simpler than the generic case and may be achieved more efficiently using different instructions. The efficiency gain may be, for example, in terms of a reduced energy consumption or increased processing speed. The present technique exploits this recognition by providing an embedded opcode within the intermediate value and using this to indicate partway through the execution of a sequence of program instructions that at least some of the originally selected program instructions within the sequence may be replaced with substitute instructions that may more efficiently, or in some other beneficial manner, be better suited to the evaluation being performed.

The determination of the embedded opcode could be performed in a variety of different ways, but in at least some embodiments it is determined from one or more input operands of the data processing function. These input operands when at least partially evaluated by the intermediate value generating instruction may indicate that it is more appropriate to use the substitute instruction in place of the intermediate value consuming instruction and to execute the substitute instruction as at least part of evaluating the data processing function instead of the original sequence of program instructions.

When the first execution path is being followed, the intermediate value generating instruction may serve to generate an intermediate value corresponding to a partial evaluation of the data processing function. When the second execution path is followed, the intermediate generating instruction may have its execution modified such that it consumes less energy and the intermediate data value does not correspond to the partial evaluation of the data processing function as the substitute instruction does not require this partial evaluation as an input thereto.

When the execution of the intermediate value generating instruction is modified, in some embodiments the intermediate data value may serve to pass as an input operand to the substitute instruction at least one of the one or more operands to the data processing function. The substitute instruction may require these original input operands as part of its execution requirements.

The present techniques may be used in a variety of different processing micro-architectural arrangements. In some micro-architectural arrangements, the data processing circuitry and instruction decoder circuitry are part of a processing pipeline that is configured to evaluate the data processing function by executing the sequence of program instructions without stalling the processing pipeline. Such micro-architectures are well suited to applications, such as within graphics processing units, where processing throughput is more significant than latency and in this situation the ability to modify an original sequence of program instructions by the use of the substitute instruction can improve the behaviour without disturbing the normal flow of the instructions through the processing pipeline.

One particular circumstance where the use of the substitute instruction may be beneficial is when the first execution path evaluates the data processing function with a precision different from when the second execution path evaluates the data processing function. In this circumstance modifying the original sequence of program instructions to instead use the substitute instruction can result in a different precision of the evaluation with that precision matching better with the precision of other data processing function evaluations being performed.

As an example, a generic evaluation of a power function $a^b$ may be performed with the generic sequence of program instructions in the general case and one level of precision via the first execution path. However, in the circumstance that the values of either a or b are such that the general power function matches another data processing function for which a different dedicated instruction is provided (e.g. $a^2$), then using this different dedicated instruction as the substitute instruction to instead evaluate the data processing function via this alternative substitute instruction which may be calculated at a second different precision has the advantage that the same precision of result will be produced independent upon whether or not the evaluation was initially based upon the general power function $a^b$, where b=2, or the more specific function $a^2$. This is important as the programmer may expect the same result to be achieved irrespective of whether the general power function or the more specific square function is used and an inappropriate operation may result if these two execution paths are used and, for example, a difference between the results is calculated and does not equal zero as would be expected by the programmer if the precisions were the same.

While not restricted to this particular use, the issue of differences in precision has a generally high significance when a and b are floating point operands.

In the context of a general purpose power function $a^b$, the substitute instructions depending upon particular values of the input operands which may be used can take a variety of different forms. The substitute instructions may for example evaluate $a^2$, 1/a, $\sqrt{a}$, 1/$\sqrt{a}$ or $2^b$.

In some embodiments the degree of micro-architectural change needed to support the present techniques is reduced when the data processing circuitry and the instruction decoder circuitry are part of a processing pipeline and the substitute instruction passes along the processing pipeline in place the intermediate value consuming instruction which is no longer used.

Viewed from another aspect the present invention provides an apparatus for processing data comprising:

data processing means for executing data processing operations specified by program instructions; and instruction decoder means for decoding program instructions to generate control signals for controlling said data processing circuitry to execute said data processing operations specified by said program instructions; wherein said instruction decoder means and said data processing means decode and execute a sequence of program instructions to evaluate a data processing function;

said sequence of program instructions includes an intermediate value generating instruction for controlling generation of an intermediate value including an intermediate data value and an embedded opcode value;

said sequence of program instructions includes, after said intermediate value generating instruction, an intermediate value consuming instruction for consuming said intermediate value;

said instruction decoder means and said data processing means operate in dependence upon said embedded opcode value to follow one of a first execution path and a second execution path:
  (i) said first execution path comprising completing evaluation of said data processing function using said intermediate value consuming instruction; and
  (ii) said second execution path comprising substituting a substitute instruction in place of said intermediate value consuming instruction and executing said substitute instruction to evaluate said data processing function instead of said sequence of program instructions.

Viewed from a further aspect the present invention provides a method of processing data comprising the steps of:

decoding and executing a sequence of program instructions to evaluate a data processing function, wherein said sequence of program instructions includes an intermediate value generating instruction for controlling generation of an intermediate value including an intermediate data value and an embedded opcode value;

said sequence of program instructions includes, after said intermediate value generating instruction, an intermediate value consuming instruction for consuming said intermediate value;

said steps of decoding and executing operate in dependence upon said embedded opcode value to follow one of a first execution path and a second execution path:
  (i) said first execution path comprising completing evaluation of said data processing function using said intermediate value consuming instruction; and
  (ii) said second execution path comprising substituting a substitute instruction in place of said intermediate value consuming instruction and executing said substitute instruction to evaluate said data processing function instead of said sequence of program instructions.

The above, and other objects, features and advantages of this invention will be apparent from the following detailed description of illustrative embodiments which is to be read in connection with the accompanying drawings.

DESCRIPTION OF THE EMBODIMENTS

Figure 1:
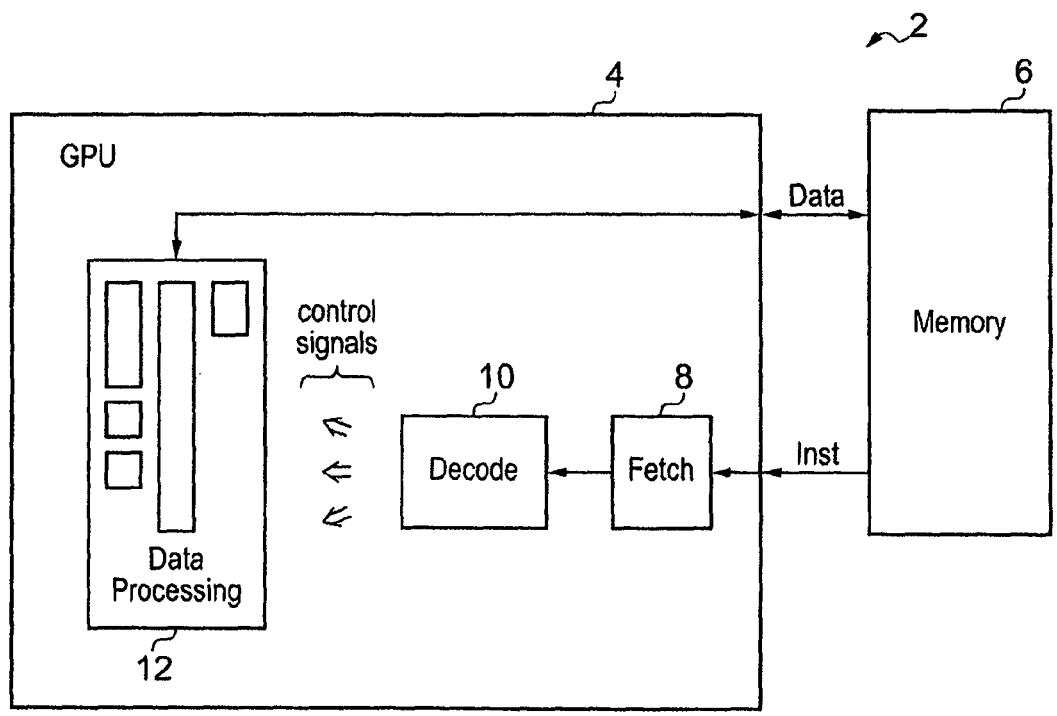
FIG. 1 schematically illustrates a data processing system including a graphics processing unit coupled to a memory and serving to evaluate data processing functions by executing a sequence of program instructions.

FIG. 1 schematically illustrates a data processing system 2 including a graphics processing unit 4 coupled to a memory 6. The memory 6 stores program instructions to be executed and data values, such as graphics data values, to be manipulated. The graphics processing unit 4 includes fetch circuitry 8 for fetching program instructions from the memory 6. Instruction decoder circuitry 10 decodes the fetched program instructions and generates control signals for controlling data processing circuitry 12 to perform desired data processing operations. The data processing circuitry 12 may include a plurality of execution pipelines, such as arithmetic pipeline, a SIMD pipeline, a floating point pipeline etc.

In the context of a graphics processing unit 4 when processing throughput may be more significant than latency, it is known to provide processing pipelines which are deep and are arranged such that they do not stall when executing a sequence of program instructions to evaluate a data processing function. It will be understood by those in this technical field that the graphics processing unit 4 will typically include many further circuit elements and that these have been omitted from FIG. 1 for the sake of clarity.

When it is desired to evaluate a data processing function, such as $a^b$, a compiler program will generate a sequence of program instructions which when executed within the graphics processing unit 4 will serve to generate a result corresponding to the evaluation of that data processing function for the supplied input operands. When the data processing function to be evaluated in relatively complex, it may not be possible to provide a single program instruction which will evaluate that data processing function and meet the cycle timing of the processing pipeline. In this circumstance, the sequence of program instructions may include an intermediate value generating instruction, an intermediate value consuming instruction and, in some cases, one or more further instructions which together serve to evaluate the desired data processing function.

A generic data processing function such as $a^b$ may be used to evaluate a data processing function which for some input operand values corresponds to specific data processing functions for which different program instructions are provided that may, for example, be executed in a single processing cycle. For example, the data processing circuitry 12 may support a data processing instruction which evaluates $a^2$ in a single processing cycle, whereas the sequence of program instructions provided to evaluate the more general $a^b$ spreads over multiple instruction cycles. In this case, should the sequence of program instructions corresponding to the general case be executed when the input operand specifying b has a value of 2, this evaluation could have been performed using the more specific instruction supporting the evaluation of $a^2$. This more specific instruction will typically execute using a different execution path (utilising different execution hardware or combinations of hardware, and may take fewer processing cycles and/or consume less energy). A further factor is that the two execution paths which may be used to evaluate the result (i.e. the generic sequence of instructions evaluating $a^b$ and the more specific instruction evaluating $a^2$) may produce a result with different levels of precision. This is particularly the case when the input operands a and b are floating point operands.

Figure 2:
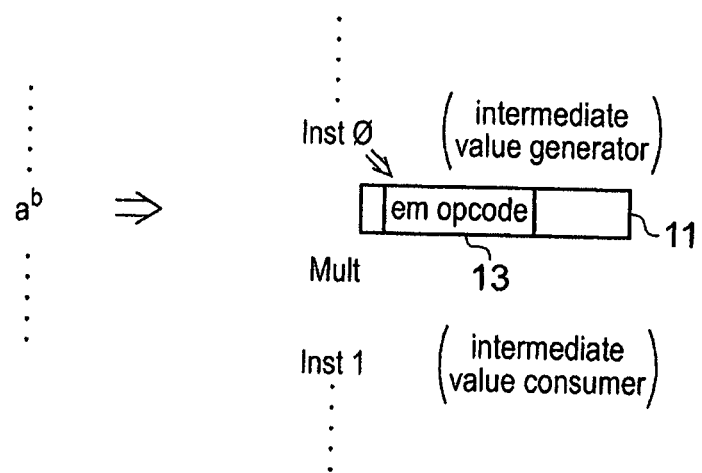
FIG. 2 illustrates a data processing function to be evaluated being mapped to a sequence of program instructions.

FIG. 2 schematically illustrates how a data processing function $a^b$ to be evaluated is represented within the program flow by a sequence of program instructions Inst0, Mu1, Inst1. In this example, the first instruction Inst0 is an intermediate value generating instruction and the final instruction Inst1 is an intermediate value consuming instruction. The Mu1 instruction between the intermediate value generating instruction and the intermediate value consuming instruction is an integer multiply instruction. The intermediate value generating instruction Inst0 generates an intermediate value 11 including an embedded opcode value 13 which is passed to the following instructions Mu1 and Inst1. The intermediate value consuming instruction Inst1 can use part or all of the intermediate value generating instruction's intermediate value 11 as well as an intermediate value generated by the Mu1 instruction to perform the processing necessary to complete the evaluation of $a^b$, which has already been partially performed by the preceding instructions within the sequence of program instructions.

The embedded opcode 13 within the intermediate value 11 generated by the intermediate value generating instruction Inst0 is used to signal whether or not the intermediate value consuming instruction Inst1 may be replaced with a substitute instruction. In particular, upon decoding and execution of the intermediate value generated instruction Inst0 the input operands have been evaluated and it can be determined that a substitute instruction may replace the intermediate value consuming instruction Inst1 and produce a result more efficiently or with a level of precision desired to preserve consistency between the precision produced by evaluating a function using the general purpose sequence of program instructions of FIG. 2 and a dedicated specific instruction used as the substitute instruction. If the substitute instruction is not to be used, then evaluation of the data processing function proceeds via a first execution path using the initially intended resources of the data processing circuitry 12. If the second execution path is to be used when the substitute instruction has replaced the intermediate value consuming instruction Inst1, it is possible that execution of the intermediate value generating instruction may be modified. For example, in this circumstance the intermediate value (other than the embedded opcode and any input operands passed through unaltered) will not be required by the intermediate value consuming instruction Inst1 and so a lower energy execution of the intermediate value generating instruction Inst0 may be performed instead. The multiplying instruction Mu1 may continue to be executed even though it is not required, but its execution may be rendered less energy consuming by, for example, setting one or both of its input operands to zero whereby the multiply will early terminate.

Figure 3:
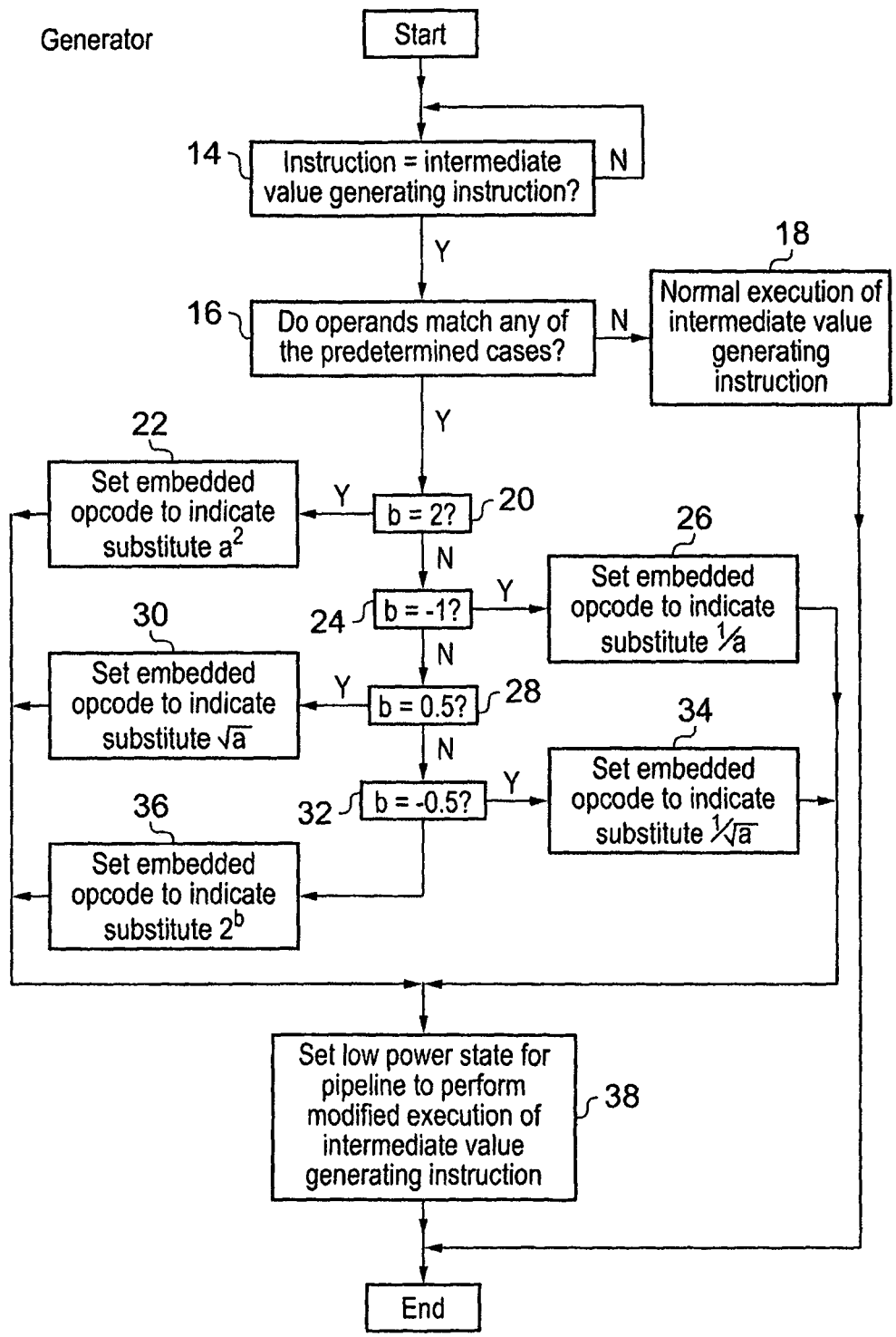
FIG. 3 is a flow diagram schematically illustrating the processing of an intermediate value generating instruction.

FIG. 3 schematically illustrates the processing of an intermediate value generating instruction. At step 14 the processing waits until an intermediate value generating instruction is received. Step 16 then determines whether any of the input operands of the intermediate data value generating instruction match a predetermined case where it is known that a substitute instruction should be used in place of the originally intended sequence of program instructions including the intermediate value generating instruction. If none of these predetermined cases matching the input operands is detected at step 16, then processing proceeds to step 18 where normal execution of the intermediate value generating instruction is performed corresponding to the full execution of, for example, the sequence of program instructions illustrated in FIG. 2.

If the determination at step 16 is that the input operands do match one of the predetermined cases, then processing passes to step 20 where it is determined whether or not the input operand b (in the case of evaluating the data processing function $a^b$) is equal to 2. If this is the case, then step 22 serves to set the embedded opcode in the intermediate value to indicate that a substitute instruction corresponding to $a^2$ should be used in place the later intermediate value consuming instruction.

If the determination at step 20 is that b is not equal 2, then processing proceeds to step 24 where a determination is made as to whether or not b=−1. If b=−1, then processing proceeds to step 26 where the embedded code is set to a value indicating that a substitute instruction corresponding to 1/a should be used instead of the intermediate value consuming instruction.

If the determination at step 24 is that b does not equal −1, then processing proceeds to step 28 where a determination is made as to whether or not b=0.5. If b=0.5, then processing proceeds to step 30 where the embedded opcode is set to a value to indicate that a substitute instruction corresponding to $\sqrt{a}$ should be used in place of the intermediate value consuming instruction.

If the determination at step 28 is that b does not equal 0.5, then processing proceeds to step 32 where a determination is made as to whether or not b=−0.5. If b=−0.5, then processing proceeds to step 34 where the embedded opcode is set to indicate that a substitute instruction corresponding to $1/\sqrt{a}$ should be used instead of the intermediate value consuming instruction.

If all of the tests at steps 20, 24, 28 and 32 have produced negative results then the only input operand which can have produced the match at step 16 is that a=2. In this case, step 34 serves to set the embedded opcode to indicate that the substitute instruction corresponding to $2^b$ should be executed instead of the intermediate value consuming instruction.

After any of steps 22, 26, 30, 34 and 36 have been performed to set the embedded opcode value, processing proceeds to step 38 where a low power execution state for the intermediate value generating instruction is set such that modified execution of this intermediate value generating instruction is performed. This may, for example, correspond to providing within the intermediate value the original input operands to the intermediate value generating instruction such that these can be used by the subsequent instructions, and in particular the substitute instruction to evaluate the desired data processing function.

Figure 4:
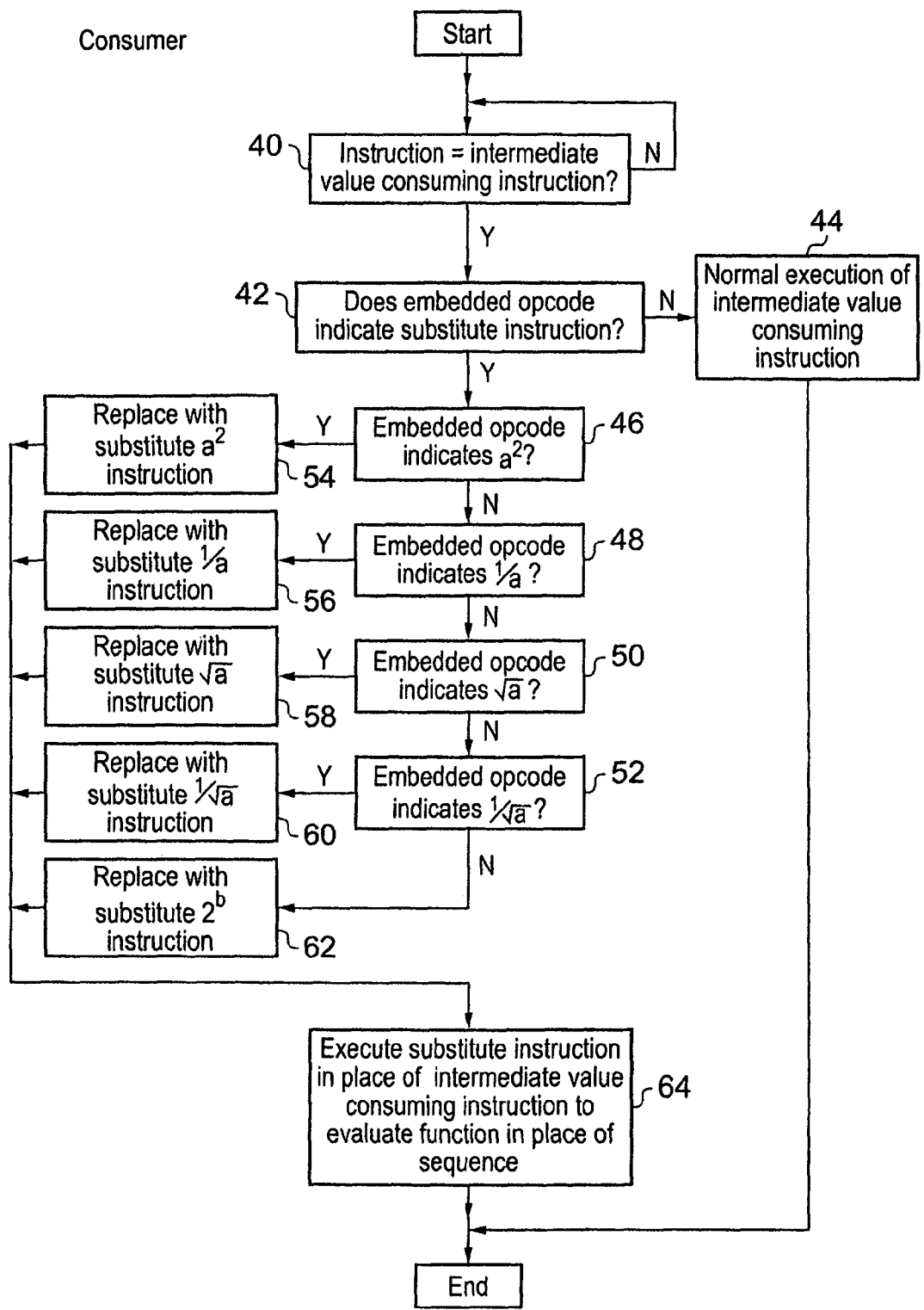
FIG. 4 is a flow diagram schematically illustrating the processing of an intermediate value consuming instruction.

FIG. 4 schematically illustrates the processing of an intermediate value consuming instruction. At step 40 processing waits until an intermediate value consuming instruction is received. Step 42 determines whether or not the embedded opcode within the intermediate value passed to the intermediate value consuming instruction indicates that a subsequent instruction should be employed in place of the intermediate value consuming instruction. If the embedded opcode tested at step 42 does not so indicate, then processing proceeds to step 44 where normal execution of the intermediate value consuming instruction is performed to evaluate the desired data processing function in accordance, for example, with the sequence of program instructions illustrated in FIG. 2. If the determination at step 42 is that the embedded opcode does indicate that a substitute instruction should be used, then steps 46, 48, 50 and 52 determine which substitute instruction is indicated by the embedded opcode. When a match occurs in any of these steps 46, 48, 50, 52, then processing proceeds to the corresponding one of the steps 54, 56, 58, 60 where the intermediate value consuming instruction is replaced with the corresponding substitute instruction. If none of the steps 46, 48, 50, 52 indicates a match, then the embedded opcode indicating a substitution detected at step 42 corresponds to the substitute instruction evaluating $2^b$ and this substitute instruction is used to replace the intermediate value consuming instruction at step 62.

Following any one of the substitutions performed at steps 54, 56, 58, 60, 62, processing proceeds to step 64 where the substitute instruction is executed in place of the intermediate value consuming instruction to evaluate the function in place of the original sequence of program instructions, such as the sequence illustrated in FIG. 2.

The substitute instruction may evaluate the data processing function with a precision different from that which would be produced by the execution of the original sequence of program instructions. This can be useful to provide a match between the evaluation of a data processing function using a generic sequence of program instructions, such as that illustrated in FIG. 2, compared with the result which is generated when a more specific program instruction is directly used to evaluate that function. It may be advantageous that the same precision is produced for the evaluation of the data processing function irrespective of whether the generic sequence of program instructions is used or the more specific instruction is used. The present technique for substituting the intermediate value consuming instruction with the substitute instruction provides such a match of precision as well as, for example, reducing the energy which would be consumed by fully executing the generic sequence of program instructions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
   data processing circuitry configured to execute data processing operations specified by program instructions; and
   instruction decoder circuitry configured to decode program instructions to generate control signals for controlling said data processing circuitry to execute said data processing operations specified by said program instructions; wherein
   said instruction decoder circuitry and said data processing circuitry are configured to decode and to execute a sequence of program instructions to evaluate a data processing function;
   said sequence of program instructions includes an intermediate value generating instruction, decoding of said intermediate value generating instruction by said instruction decoding circuitry, and execution of said intermediate value generating instruction by said data processing circuitry generating an intermediate value including an intermediate data value and an embedded opcode value;
   said sequence of program instructions includes, after said intermediate value generating instruction, an intermediate value consuming instruction for consuming said intermediate value; and
   said instruction decoder circuitry and said data processing circuitry are configured to operate in dependence upon said embedded opcode value to follow one of a first execution path and a second execution path:
   (i) said first execution path comprising completing evaluation of said data processing function using said intermediate value consuming instruction; and
   (ii) said second execution path comprising substituting a substitute instruction in place of said intermediate value consuming instruction and executing said substitute instruction to evaluate said data processing function instead of said sequence of program instructions.

2. Apparatus as claimed in claim 1, wherein at least one of said instruction decoder circuitry and said data processing circuitry determines said embedded opcode value from one or more input operands of said data processing function.

3. Apparatus as claimed in claim 1, wherein:
   (i) when one or more input operands of said data processing function indicate that said first execution path is to be followed, execution of said intermediate value generating instruction generates said intermediate data value corresponding to a partial evaluation of said data processing function; and (ii) when said one or more input operands of said data processing function indicate that said second execution path is to be followed, execution of said intermediate value generating instruction is modified such that less energy is consumed thereby and said intermediate data value does not correspond to said partial evaluation of said data processing function.

4. Apparatus as claimed in claim 3, wherein when execution of said intermediate value generating instruction is modified, said intermediate data value serves to pass as an input operand to said substitute instruction at least one of said one or more input operands of said data processing function.

5. Apparatus as claimed in claim 1, wherein said data processing circuitry and said instruction decoder circuitry are part of a processing pipeline and are configured to evaluate said data processing function by executing said sequence of program instructions without stalling said processing pipeline.

6. Apparatus as claimed in claim 1, wherein said data processing circuitry and said instruction decoder circuitry are part of a graphics processing unit.

7. Apparatus as claimed in claim 1, wherein said first execution path evaluates said data processing function with a precision different from when said second execution path evaluates said data processing function.

8. Apparatus as claimed in claim 1, wherein said data processing function evaluates an expression $a^b$, where a and b are input operand of said data processing function.

9. Apparatus as claimed in claim 8, wherein a and b are floating point operands.

10. Apparatus as claimed in claim 9, wherein when b=2, said substitute instruction is a program instruction that evaluates $a^2$.

11. Apparatus as claimed in claim 9, wherein when b=−1, said substitute instruction is a program instruction that evaluates $1/a$.

12. Apparatus as claimed in claim 9, wherein when b=0.5, said substitute instruction is a program instruction that evaluates $\sqrt{a}$.

13. Apparatus as claimed in claim 9, wherein when b=−0.5, said substitute instruction is a program instruction that evaluates $1/\sqrt{a}$.

14. Apparatus as claimed in claim 9, wherein when a=2, said substitute instruction is a program instruction that evaluates $2^b$.

15. Apparatus as claimed in claim 1, wherein said data processing circuitry and said instruction decoder circuitry are part of a processing pipeline and said substitute instruction passes along said processing pipeline in place of said intermediate value consuming instruction.

16. Apparatus for processing data comprising:
data processing means for executing data processing operations specified by program instructions; and
instruction decoder means for decoding program instructions to generate control signals for controlling said data processing means; wherein
said instruction decoder means and said data processing means decode and execute a sequence of program instructions to evaluate a data processing function;
said sequence of program instructions includes an intermediate value generating instruction, decoding of said intermediate value generating instruction by said instruction decoder means, and execution of said intermediate value generating instruction by said data processing means generating an intermediate value including an intermediate data value and an embedded opcode value;
said sequence of program instructions includes, after said intermediate value generating instruction, an intermediate value consuming instruction for consuming said intermediate value;
said instruction decoder means and said data processing means operate in dependence upon said embedded opcode value to follow one of a first execution path and a second execution path:
(i) said first execution path comprising completing evaluation of said data processing function using said intermediate value consuming instruction; and
(ii) said second execution path comprising substituting a substitute instruction in place of said intermediate value consuming instruction and executing said substitute instruction to evaluate said data processing function instead of said sequence of program instructions.

17. A method of processing data comprising the steps of:
decoding and executing a sequence of program instructions to evaluate a data processing function, wherein
said sequence of program instructions includes an intermediate value generating instruction, decoding and execution of said intermediate value generating instruction generating an intermediate value including an intermediate data value and an embedded opcode value;
said sequence of program instructions includes, after said intermediate value generating instruction, an intermediate value consuming instruction for consuming said intermediate value;
said steps of decoding and executing operate in dependence upon said embedded opcode value to follow one of a first execution path and a second execution path:
(i) said first execution path comprising completing evaluation of said data processing function using said intermediate value consuming instruction; and
(ii) said second execution path comprising substituting a substitute instruction in place of said intermediate value consuming instruction and executing said substitute instruction to evaluate said data processing function instead of said sequence of program instructions.

* * * * *